(12) United States Patent
Takane

(10) Patent No.: US 8,345,109 B2
(45) Date of Patent: Jan. 1, 2013

(54) IMAGING DEVICE AND ITS SHUTTER DRIVE MODE SELECTION METHOD

(75) Inventor: Yasuo Takane, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 859 days.

(21) Appl. No.: 12/341,111

(22) Filed: Dec. 22, 2008

(65) Prior Publication Data

US 2009/0167911 A1 Jul. 2, 2009

(30) Foreign Application Priority Data

Dec. 27, 2007 (JP) ................................ P2007-337204

(51) Int. Cl.
*H04N 5/228* (2006.01)
*H04N 3/14* (2006.01)
*H04N 5/335* (2011.01)

(52) U.S. Cl. ............... 348/208.16; 348/208.12; 348/296

(58) Field of Classification Search ................... 348/296, 348/208
See application file for complete search history.

(56) References Cited

U.S. PATENT DOCUMENTS

| | | | | |
|---|---|---|---|---|
| 7,815,120 B2* | 10/2010 | Carlson | ................... | 235/462.41 |
| 2006/0140604 A1* | 6/2006 | Suda | ................ | 396/55 |
| 2006/0202036 A1* | 9/2006 | Wang et al. | ............... | 235/462.07 |
| 2007/0058966 A1* | 3/2007 | Irinouchi et al. | ............... | 396/153 |
| 2009/0002501 A1* | 1/2009 | Silsby et al. | ............... | 348/208.16 |
| 2009/0021612 A1* | 1/2009 | Hamilton et al. | ............. | 348/249 |
| 2009/0084847 A1* | 4/2009 | He et al. | ......................... | 235/455 |
| 2009/0303362 A1* | 12/2009 | Ebihara | ......................... | 348/296 |
| 2010/0090007 A1* | 4/2010 | Wang et al. | ............... | 235/462.11 |
| 2010/0329657 A1* | 12/2010 | Hosoi et al. | ................... | 396/169 |

FOREIGN PATENT DOCUMENTS

| JP | 2005-86271 A | 3/2005 |
|---|---|---|
| JP | 2006-222637 A | 8/2006 |
| JP | 2007-19706 A | 1/2007 |
| JP | 2007-142702 A | 6/2007 |

* cited by examiner

*Primary Examiner* — Sinh Tran
*Assistant Examiner* — Christopher K Peterson
(74) *Attorney, Agent, or Firm* — Birch, Stewart, Kolasch & Birch, LLP

(57) ABSTRACT

An imaging device includes a MOS image sensor that shoots an image of a subject, and a control unit that selects one of plural shutter drive modes and drives the MOS image sensor in the selected shutter drive mode. The control unit analyzes a through image of a subject that is obtained by the MOS image sensor before main shooting (step S3) and performs the selection automatically based on a result of the analysis (steps S6, S9, and S10).

16 Claims, 9 Drawing Sheets

FIG. 9

Drive methods of CMOS sensors features

| Drive method | Mechanical shutter | Image distortion | Moving image frame rate | Shutter speed | Image quality (reset noise) |
|---|---|---|---|---|---|
| Global reset method | Necessary | None | X | Low | None |
| Global shutter method (Electronic shutter method) | Unnecessary | None | Medium | High | Occurs |
| Rolling shutter method | Unnecessary | Occurs | High | Very high | None | ered
IMAGING DEVICE AND ITS SHUTTER DRIVE MODE SELECTION METHOD

CROSS-REFERENCE TO RELATED APPLICATIONS

This application is based upon and claims the benefit of priority from the Japanese Patent Application No. 2007-337204 filed on Dec. 27, 2007, the entire contents of which are incorporated herein by reference.

BACKGROUND OF THE INVENTION

1. Field of the Invention

The invention relates to an imaging device incorporating a MOS image sensor and its shutter drive mode selection method.

2. Description of the Related Art

Digital cameras incorporating a CMOS image sensor have various shutter methods, that is, a global reset method which uses a mechanical shutter, a global shutter method in which the electronic shutter timing is controlled so as to be identical for all pixels, and a rolling shutter method in which the electronic shutter timing is controlled on a pixel-line-by-pixel-line basis.

What shutter method to employ depends on the state of a subject and the shooting mode (still image shooting mode or moving image shooting mode). In view of this, JP 2007-19706 A describes that the above three shutter methods are prepared in advance as shutter drive modes and that one shutter drive mode can be selected according to a shooting mode and a state of a subject.

CMOS solid-state imaging devices mainly have the three shutter methods, that is, three shutter drive modes. However, each of these shutter methods has advantages and disadvantages as shown in FIG. 9, and hence optimum image quality cannot be obtained unless a proper shutter drive method is selected.

JP 2007-19706 A is directed to single-lens reflex cameras. And, a shutter drive mode is selected manually or selected automatically using a moving body detection system such as an AF module. However, it is highly desired to incorporate, into digital cameras, a function of selecting a shutter drive mode automatically in a more appropriate manner.

SUMMARY OF THE INVENTION

The invention provides an imaging device and its shutter drive mode selection method which make it possible to select a proper shutter drive mode automatically.

According to an aspect of the invention, an imaging device includes a MOS image sensor and a control unit. The MOS image sensor shoots an image of a subject. The control unit selects one of plural shutter drive modes and drives the MOS image sensor in the selected shutter drive mode. The imaging device and its shutter drive mode selection method analyze a through image of the subject that is obtained by the MOS image sensor before main shooting, and perform the selection automatically based on a result of the analysis.

The imaging device and its shutter drive mode selection method may perform the selection automatically based on a result of comparison between a magnitude of an inter-frame motion vector of the through image and a reference value.

The imaging device and its shutter drive mode selection method may calculate an inter-frame motion vector of the through image and perform the selection automatically based on the inter-frame motion vector.

The imaging device and its shutter drive mode selection method may calculate an inter-frame motion vector, for an entire frame, of the through image and perform the selection automatically based on the inter-frame motion vector.

The imaging device and its shutter drive mode selection method may divide one frame into plural blocks, calculate an inter-frame motion vector, for each of the plural blocks, of the through image, and perform the selection automatically based on the inter-frame motion vectors for the respective blocks. Also, the imaging device and its shutter drive mode selection method may perform the selection automatically by comparing a variation of the inter-frame motion vectors for the respective blocks with a given value and comparing magnitudes of the inter-frame motion vectors for the respective blocks with a reference value.

The imaging device and its shutter drive mode selection method may correct the reference value based on a photometric value.

When the main shooting is in a sequential shooting mode, the imaging device and its shutter drive mode selection method may perform the selection automatically further based on an analysis result of an inter-frame motion vector obtained during the main shooting.

When a still image of the subject is shot, the imaging device and its shutter drive mode selection method may select one of a rolling shutter drive mode, a global shutter drive mode, a global reset drive mode. When a moving image of the subject is shot, the imaging device and its shutter drive mode selection method may select one of the rolling shutter drive mode and the global shutter drive mode.

If a flicker detecting unit detects a flicker in shooting the still image, the imaging device and its shutter drive mode selection method may select the global reset drive mode. If the flicker detecting unit detects a flicker in shooting the moving image, the imaging device and its shutter drive mode selection method may select the global shutter drive mode.

The above configuration makes it possible to take a high-quality image because the imaging device selects a proper shutter drive mode automatically by recognizing a movement situation of a subject and other factors by analyzing a through image.

BRIEF DESCRIPTION OF THE INVENTION

FIG. 9 shows advantages and disadvantages of respective shutter methods.

DETAILED DESCRIPTION OF EMBODIMENTS OF THE INVENTION

Embodiments of the invention will be hereinafter described with reference to the drawings.

Figure 1:
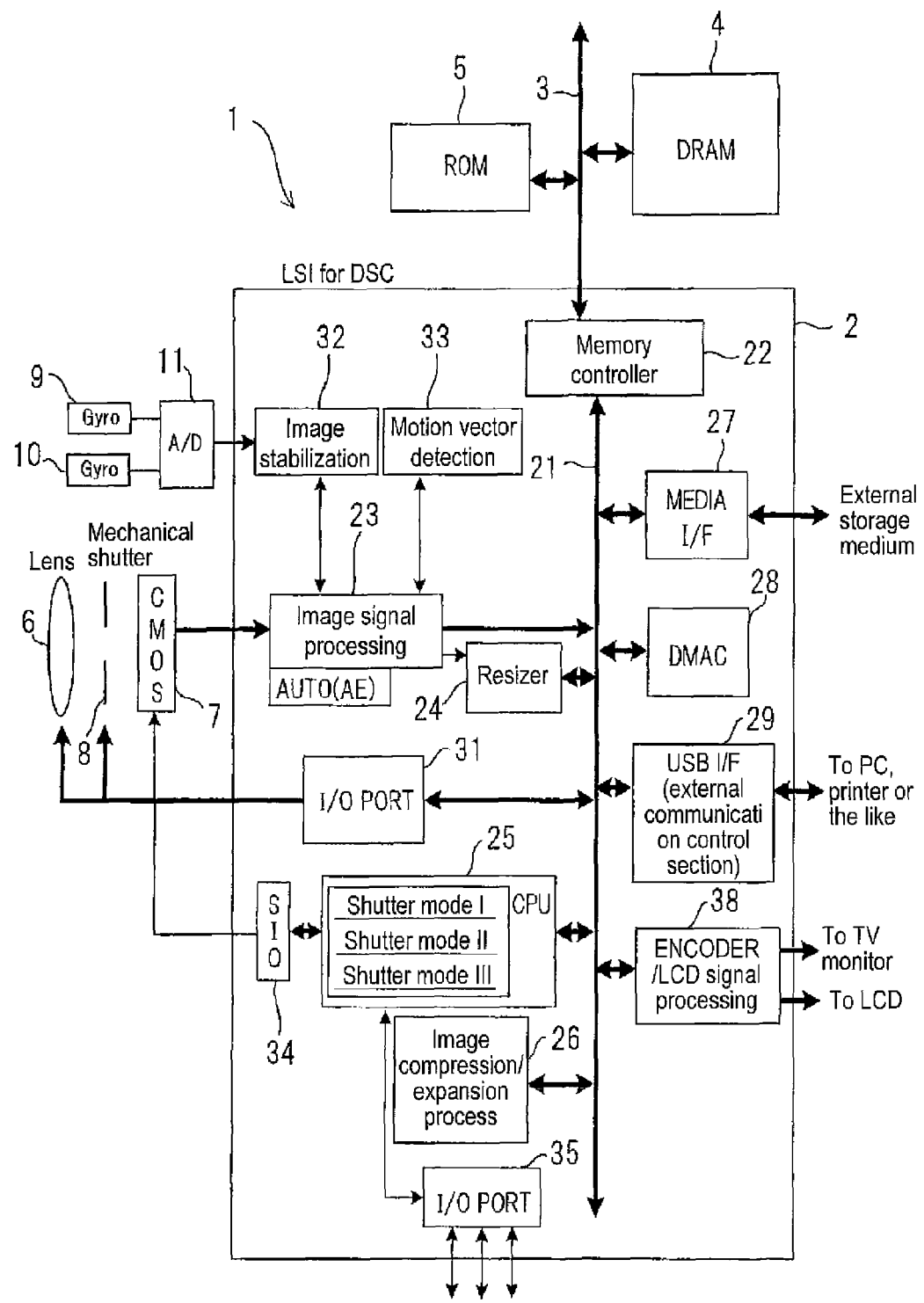
FIG. 1 is a functional block diagram of an imaging device common to embodiments of the invention.

FIG. 1 is a functional block diagram of a digital still camera having a moving image shooting function which is common to the embodiments of the invention. The digital camera 1 includes: a large-scale integrated circuit (LSI) 2 for a digital still camera (DSC); a DRAM 4 and a ROM 5 which are connected to the LSI 2 via a bus 3; an imaging lens 6 for focusing incident light coming from a subject; a CMOS image sensor 7 disposed behind the imaging lens 6; an aperture diaphragm and a mechanical shutter 8 which are disposed between the lens 6 and the sensor 7; gyro sensors 9 and 10; and an A/D conversion circuit 11 for converting detection signals of the gyro sensors 9 and 10 into digital signals and outputting them to the LSI 2.

The ROM 5 is stored with control programs (described later) etc. The DRAM 4 which is a main memory serves as a work memory during various kinds of image processing.

The LSI 2 for a digital still camera is equipped with a bus 21 and a memory controller 22 which is provided between the bus 21 and an external bus 3.

Connected to the bus 21 are an image signal processing circuit 23 for processing an image signal that is output from the CMOS image sensor 7, a resizer 24 for resizing a result of the image processing, a CPU 25 for controlling the imaging device 1 in a unified manner, an image compression/expansion circuit 26 for compressing image-processed image data and expanding a compressed image, a media interface 27 which is connected to an external storage medium, a direct memory access controller (DMAC) 28, a USB interface 29 which is connected to a PC, a printer, or the like (not shown), an encoder/LCD signal processing circuit 30 which is connected to a TV monitor and/or a liquid crystal display unit provided on the back side, for example, of the camera, and an I/O port 31.

The I/O port 31 outputs a signal for controlling the focusing position and the zooming position of the imaging lens 6 in response to an instruction received from the CPU 25 and a signal for controlling the aperture diaphragm and the mechanical shutter 8.

An image stabilization circuit 32 and a motion vector detection circuit 33 are connected to the image signal processing circuit 23. The image stabilization circuit 32 receives the detection signals of the gyro sensors 9 and 10 and the image processing result, and performs an image stabilization process. The motion vector detection circuit 33 acquires an image processing result which is obtained by taking in a through image from the CMOS image sensor 7, for example, before shooting of a still image and performing the image processing therefore (described later in detail).

Drive modes (shutter drive modes) I, II, and III are prepared in advance in the CPU 25. The CPU 25 selects one of the drive modes automatically in a manner described later and outputs a control signal of the selected drive mode to the CMOS image sensor 7 via a serial input/output (SIO) 34. In the embodiments, it is assumed that the drive modes I, II, and III are a global reset method, a global shutter method, and a rolling shutter method, respectively.

The LSI 2 is also equipped with an I/O port 35. The CPU 25 takes in various signals via the I/O port 35. For example, the CPU 25 takes in a user manipulation instruction signal, a shutter release signal, and other signals via the I/O port 35.

Figure 2:
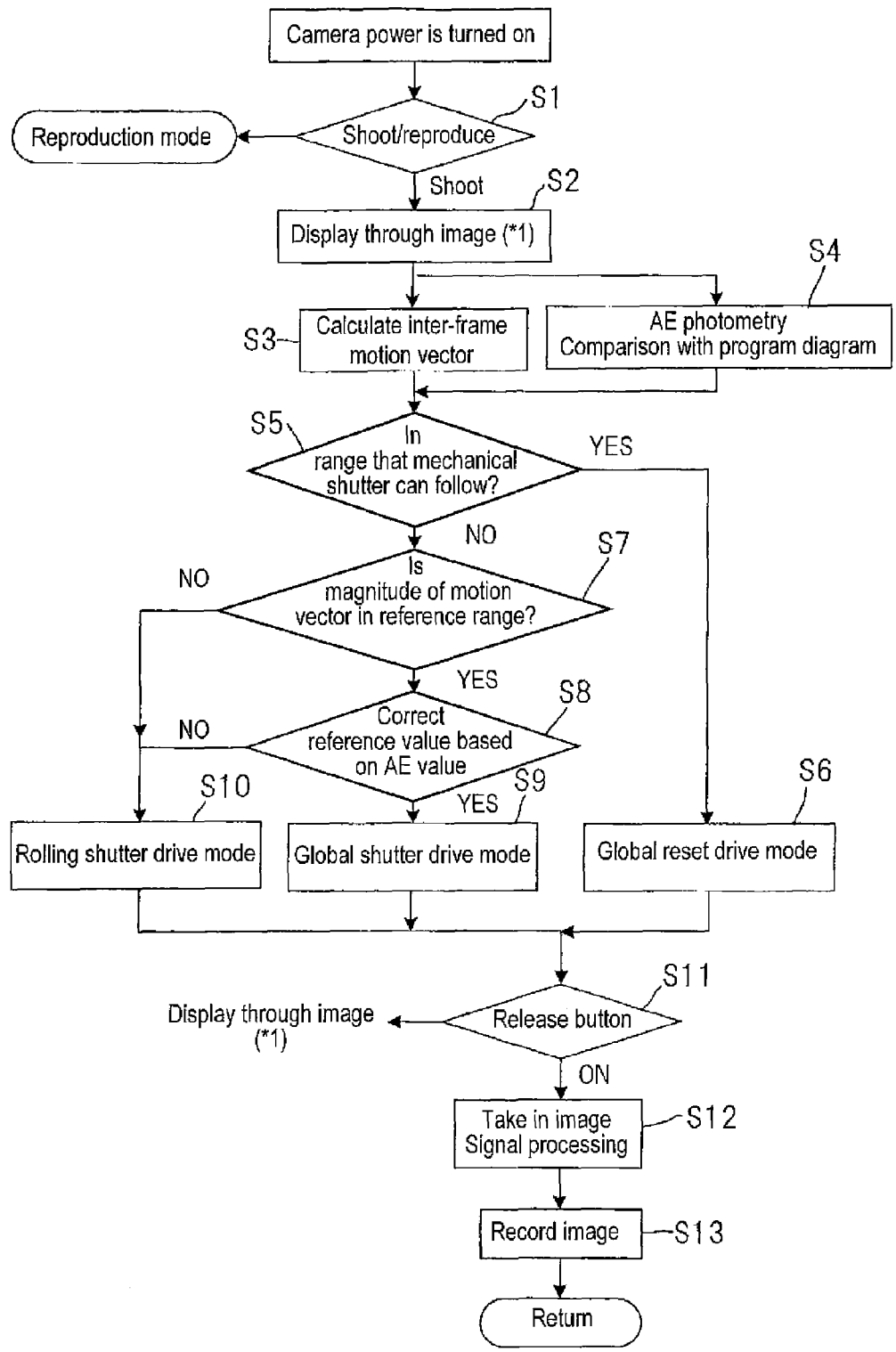
FIG. 2 is a flowchart showing the operation procedure of an imaging control program, which includes shutter drive mode selection steps, according to a first embodiment.

FIG. 2 is a flowchart showing the operation procedure of an imaging control program, which is run by the imaging device 1 of FIG. 1, according to a first embodiment. This program is activated when a power switch (not shown) of the imaging device 1 is turned on. First, at step S1, it is determined as to whether the current operation mode is a shooting mode or a reproduction mode. If the current operation mode is the reproduction mode, the process moves to a reproduction mode process. If the current operation mode is the shooting mode, the process moves to the next step S2, where a through image is displayed on the liquid crystal display unit.

The term "through image" means a subject image obtained by image-processing (with the image signal processing circuit 23) and resizing image signals that are output from the CMOS image sensor 7 in moving image form before depression of the shutter release button, that is, before main shooting. The shutter drive mode in which a through image is taken is the rolling shutter method. Then, steps S3 and S4 are executed in parallel in a state where the through image is displayed and image data of the through image exists.

At step S3, an inter-frame motion vector is calculated by processing the image data of the through images. At step S4, as performed in ordinary digital cameras, AE photometry is performed, and the result of the AE photometry is compared with a program diagram. Thereby, an exposure value and a shutter speed are determined.

Upon execution of steps S3 and S4, the process moves to step S5, and it is determined as to whether or not the shutter speed determined at step 84 is in such a range that the mechanical shutter 8 can follow. If the shutter speed can be followed by the mechanical shutter 8, the process moves from step S5 to step S6, where the global reset method is selected as a shutter drive mode.

If it is determined at step S5 that the shutter speed determined at step S4 is not in the followable range of the mechanical shutter 8, the process moves from step S5 to S7, where a magnitude of the motion vector calculated at step S3 is compared with a reference value, and it is determined as to whether or not the magnitude of the motion vector is equal to or less than the reference value. The accuracy of the reference value is enhanced by correcting it based on taking an angle-of-view value (zoom position) of the imaging lens 6, a focusing distance, an AE value, etc into consideration collectively. For example, correcting the reference value based on an AE value enhances the accuracy of selecting a shutter drive method in response to the brightness of a shooting scene.

If the magnitude of the motion vector is equal to or less than the reference value, the process moves from step S7 to S8, where it is determined as to whether or not the reference value that was used at step S7 had been corrected based on an AE value, etc. If the reference value had been corrected in such a manner, it can be determined that the determination result of step S7 is highly accurate. In this case, the process moves to step S9, where the global shutter method is selected as a shutter drive mode.

If the determination result at step S7 is negative, that is, the magnitude of the motion vector is larger than the reference value or if it is determined at step S8 that the reference value had not been corrected based on an AE value etc., the process moves to step S10, where the rolling shutter method is selected as a shutter drive mode.

If a shutter drive mode is selected at step S6, S9, or S10, the process moves to step S11, where it is determined as to whether or not the release button has been depressed. If the release button has not been depressed yet, the process returns to step S2 to execute step S2 and the following steps again.

If the release button has been depressed, the process moves to step S12, where main shooting is performed in the shutter drive mode that was selected automatically at step S6, S9, or S10, a resulting image signal is taken in by the image signal processing circuit 23 from the CMOS image sensor 7, and processed there. At step S13, image data of a subject produced by the image processing is written into the external storage medium. Then, the process returns to step S1.

As described above, motion of a subject and a shooter's movement (e.g., a camera shake, a pan, or shooting from a vehicle) are recognized by the imaging device itself from the magnitude of an inter-frame motion vector of a through image, and a shutter drive mode is selected properly according to such a situation. This enhances the ease of use of a user and makes it possible to take a good image.

Figure 3:
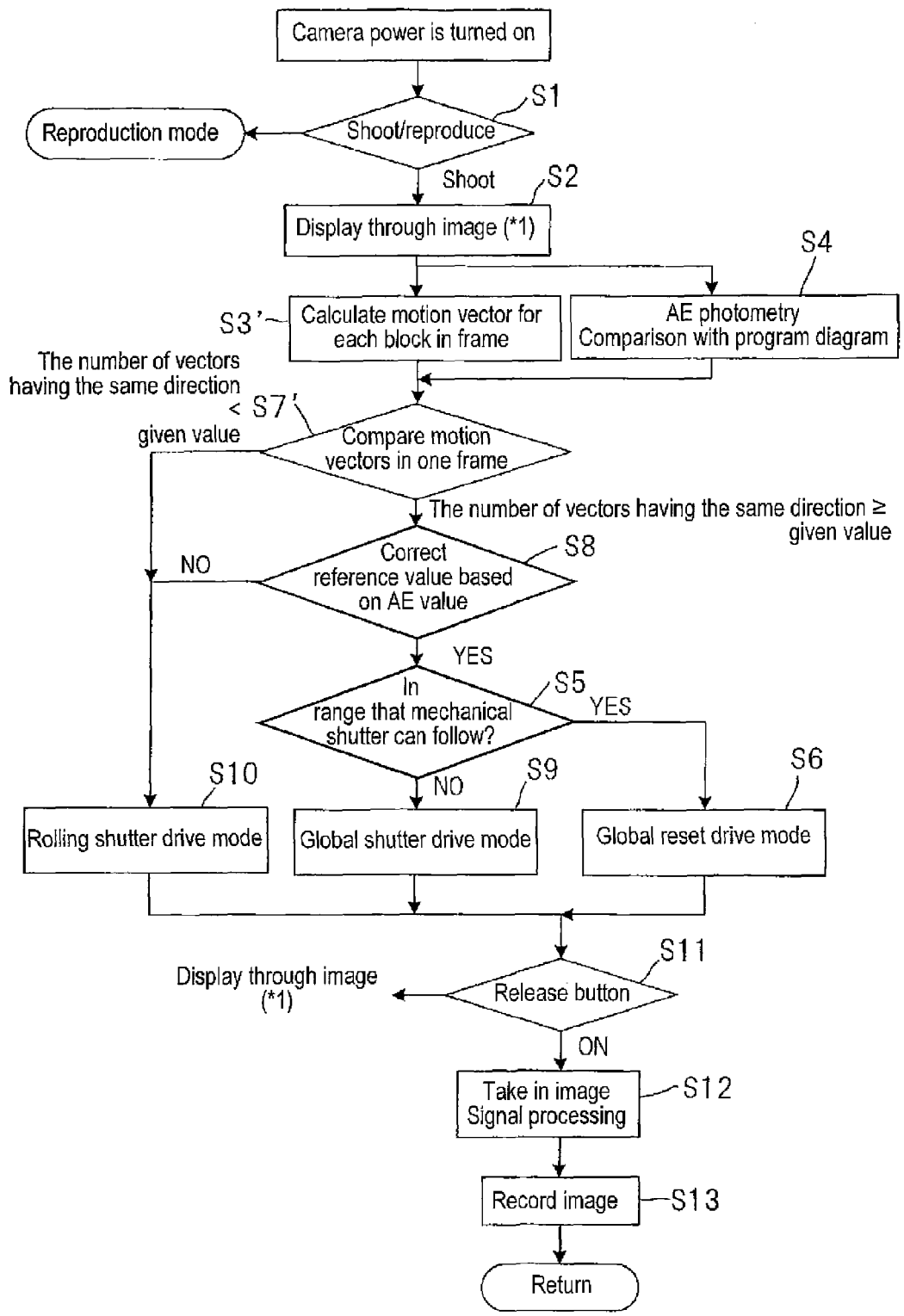
FIG. 3 is a flowchart showing the operation procedure of an imaging control program, which includes shutter drive mode selection steps, according to a second embodiment.

FIG. 3 is a flowchart showing the operation procedure of an imaging control program according to a second embodiment of the invention. The same steps as in the first embodiment (FIG. 2) are given the same symbols as in the first embodiment and will not be described in detail. Only different steps will be described below in detail.

Steps S1 and S2 of this embodiment are the same as those in the first embodiment. In replace of step S3 of the first embodiment, step S3' is executed in parallel with step S4. At step S3', each frame of a through image is divided into plural blocks, and motion vectors are calculated for the respective blocks.

Upon execution of step S3, the process moves to step S7', where motion vectors in one frame are compared. It is determined as to whether the number of motion vectors, which have the same direction and have magnitudes equal to or larger than a reference value, is equal to or larger than a given value. It is preferable to also correct this reference value based on an AE value, etc. as in the first embodiment.

If it is determined at step S7' that the number of motion vectors, which have the same direction and have magnitudes equal to or larger than the reference value, is smaller than the given value, the process moves to step S10, where the rolling shutter method is selected. If it is determined at step S7' that the number of such motion vectors, which have the same direction and have magnitudes equal to or larger than the reference value, is equal to or larger than the given value, the process moves to step S8, where it is determined as to whether or not the reference value had been corrected. If the reference value had not been corrected, the process moves to step S10, otherwise moves to step S5.

At step S5, it is determined as to whether or not the shutter speed determined at step S4 is in such a range that the mechanical shutter 8 can follow. If the shutter speed is in the followable range, the global reset method is selected at step S6. If the shutter speed is not in the followable range, the process moves to step S9, where the global shutter method is selected. Subsequent steps S11, S23, and S13 are the same as in the first embodiment.

According to this embodiment, magnitudes of motion vectors in one frame and a variation of directions of the motion vectors in one frame are compared with reference values. Therefore, motion of a subject can be determined more properly before main shooting. The rolling shutter method is selected automatically if motion in a through image per frame is small. If motion in a through image per frame is relatively large and if the determined shutter speed is out of the followable range of the mechanical shutter 8, the global shutter method is selected automatically.

Figure 4:
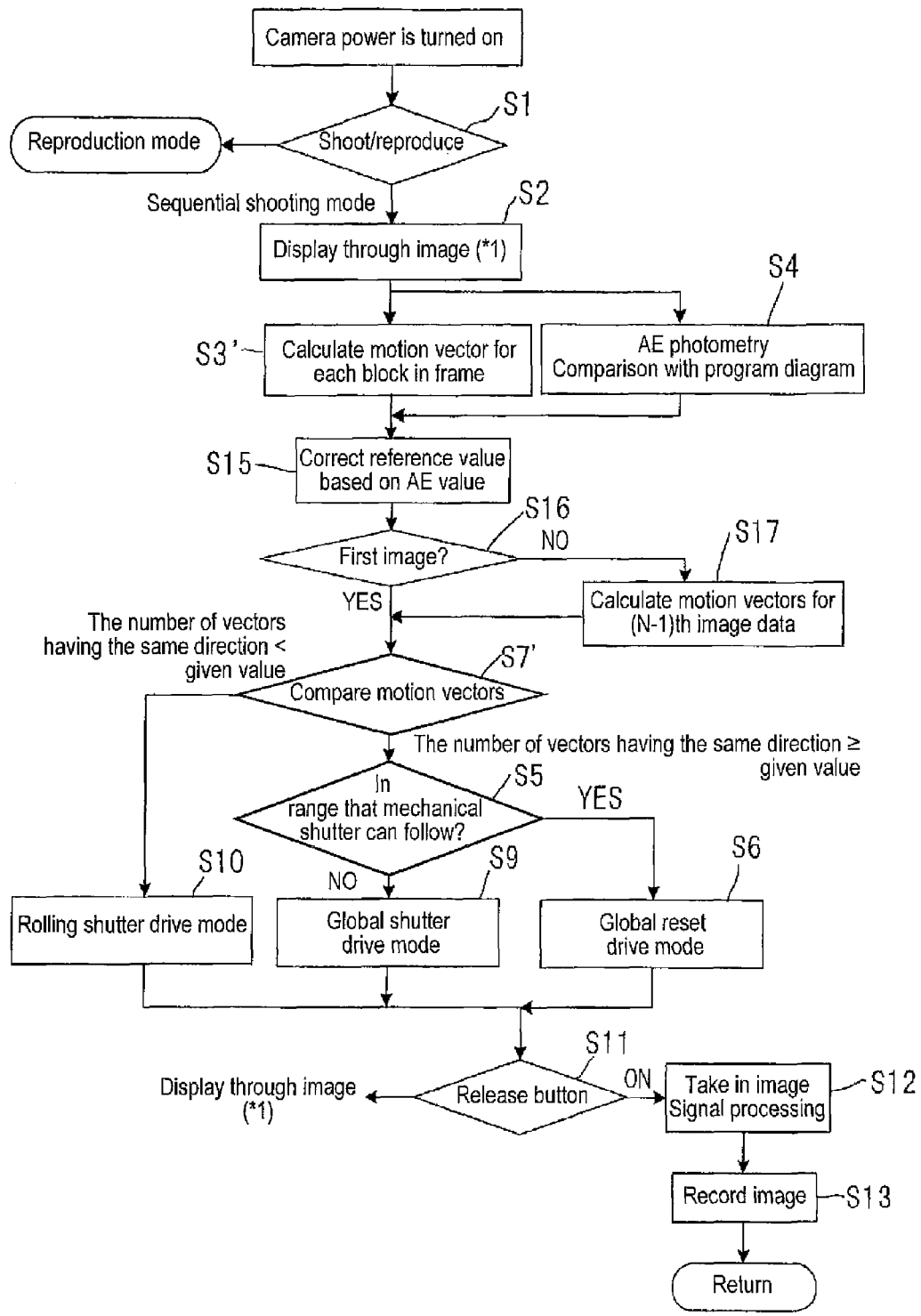
FIG. 4 is a flowchart showing the operation procedure of an imaging control program, which includes shutter drive mode selection steps, according to a third embodiment.

FIG. 4 is a flowchart showing the operation procedure of an imaging control program according to a third embodiment of the invention. The same steps as in the second embodiment (FIG. 3) are given the same symbols as those in the first and second embodiments and will not be described in detail. Only different steps will be described below in detail.

The program according to this embodiment is activated when the imaging device 1 performs shooting in a sequential shooting mode. Steps S1, S2, S3', and S4 are the same as in the second embodiment. Upon execution of steps S3' and S4, the process moves to step S15, where a reference value is corrected based on an AE value etc.

At the next step S16, it is determined as to whether or not the current shooting is shooting of a first image in the sequential shooting mode. If the current shooting is shooting of a first image, the process moves to step S7', where a determination is made based on magnitudes of the motion vectors and the number of the motion vectors. Specifically, if the number of motion vectors, which have the same direction and have magnitudes equal to or larger than a reference value, is less than a given value, the process moves to step S10. If the number of motion vectors, which have the same direction and have magnitudes equal to or larger than a reference value, is equal to or larger than the given value, the process moves to step S8, where it is determined as to whether or not the shutter speed determined at step S4 is in the followable range of the mechanical shutter 8. Then, the process moves to step S6 or S9 depending on whether or not the shutter speed is in the followable range of the mechanical shutter 8. Then, the process moves to steps S11, S12, and S13 in order.

If it is determined at step S16 that the current shooting is not shooting of a first image, that is, the current shooting is shooting of a second or subsequent image, the process moves from step S16 to step S7' through step S17.

At step S17, motion vectors are calculated for respective blocks from image data of an (N−1)th image and image data of an Nth image. Step S7' is executed with reference to the motion vectors obtained at step S17.

That is, whereas for a first image of sequential shooting a shutter drive mode is selected based on motion vectors calculated from a through image, for a second or subsequent image motion vectors are calculated based on image data produced by immediately preceding main shooting and a shutter drive mode is selected based on these motion vectors.

According to this embodiment, the shutter drive mode can be switched according to motion of a subject and other factors even during sequential shooting. Thereby, a good image can be taken according to motion of a subject and other factors.

Figure 5:
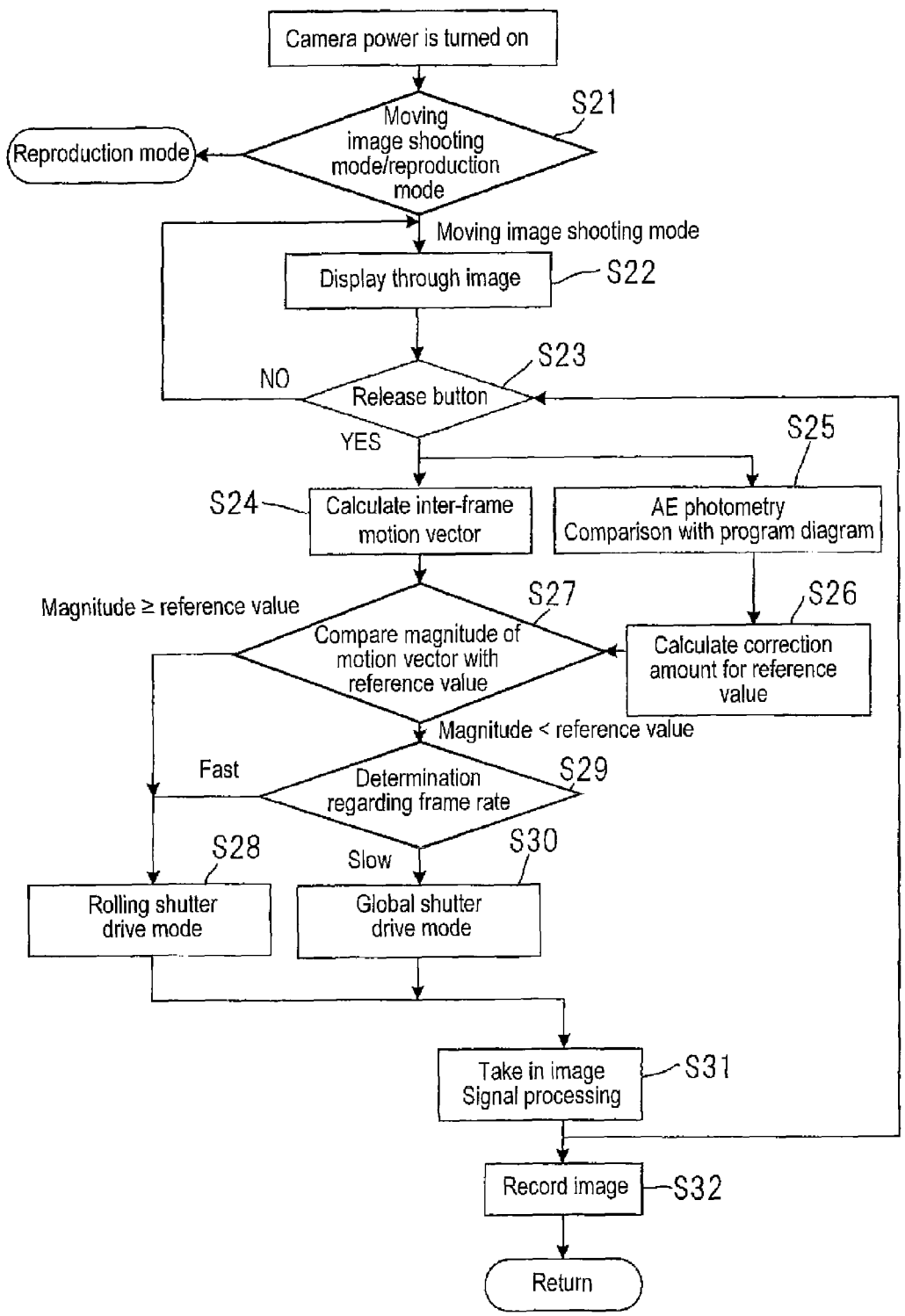
FIG. 5 is a flowchart showing the operation procedure of an imaging control program, which includes shutter drive mode selection steps, according to a fourth embodiment.

FIG. 5 is a flowchart showing the operation procedure of an imaging control program according to a fourth embodiment of the invention. The imaging control program according to this embodiment is activated in a moving image shooting mode. Because of the moving image shooting mode, the global reset method is not selected in which the mechanical shutter 8 is used.

First, at step S21, it is determined as to whether the current operation mode is a moving image shooting mode or a reproduction mode. If the current operation mode is the reproduction mode, the process moves to a reproduction mode process. If the current operation mode is the moving image shooting mode, the process moves to step S22, where a through image is displayed. At the next step S23, it is determined as to whether or not the release button has been depressed. If the release button has not been depressed yet, the process returns to step S22. If the release button has been depressed, step S24 is executed in parallel with steps S25 and S26.

At step S24, an inter-frame motion vector is calculated. At step S25, AE photometry is performed, and the result of the AE photometry is compared with a program diagram. At step S26 which is executed after step S25, a correction amount for a reference value is calculated as in the above embodiments.

Upon execution of steps S25 and S26, the process moves to step S27, where a magnitude of the motion vector is compared with the reference value. If the magnitude of the motion vector is equal or larger than the reference value (i.e., the motion quantity is larger), the process moves to step S28, where the rolling shutter method which is appropriate for a high speed operation is selected. If a magnitude of the motion vector is less than the reference value (i.e., the motion quantity is small), the process moves to the next step S29, where it is determined as to whether the frame rate is higher or lower than a given frame rate. If the frame rate is high, the process moves to step S28. If the frame rate is low, the process moves to step S30, where the global shutter method is selected.

Upon selection of a shutter method at step S28 or S30, the process moves to step S31, where moving image data is taken in. At the next step S32, the moving image data is recorded. Also, the state of the release button is determined at step S23.

According to this embodiment, even if the frame rate is increased automatically in response to fast motion of a subject in a sport scene or the like, the shutter derive mode is switched to the rolling shutter method. Thereby, a clear moving image can be taken in which blur in an image of a subject is reduced.

Figure 6:
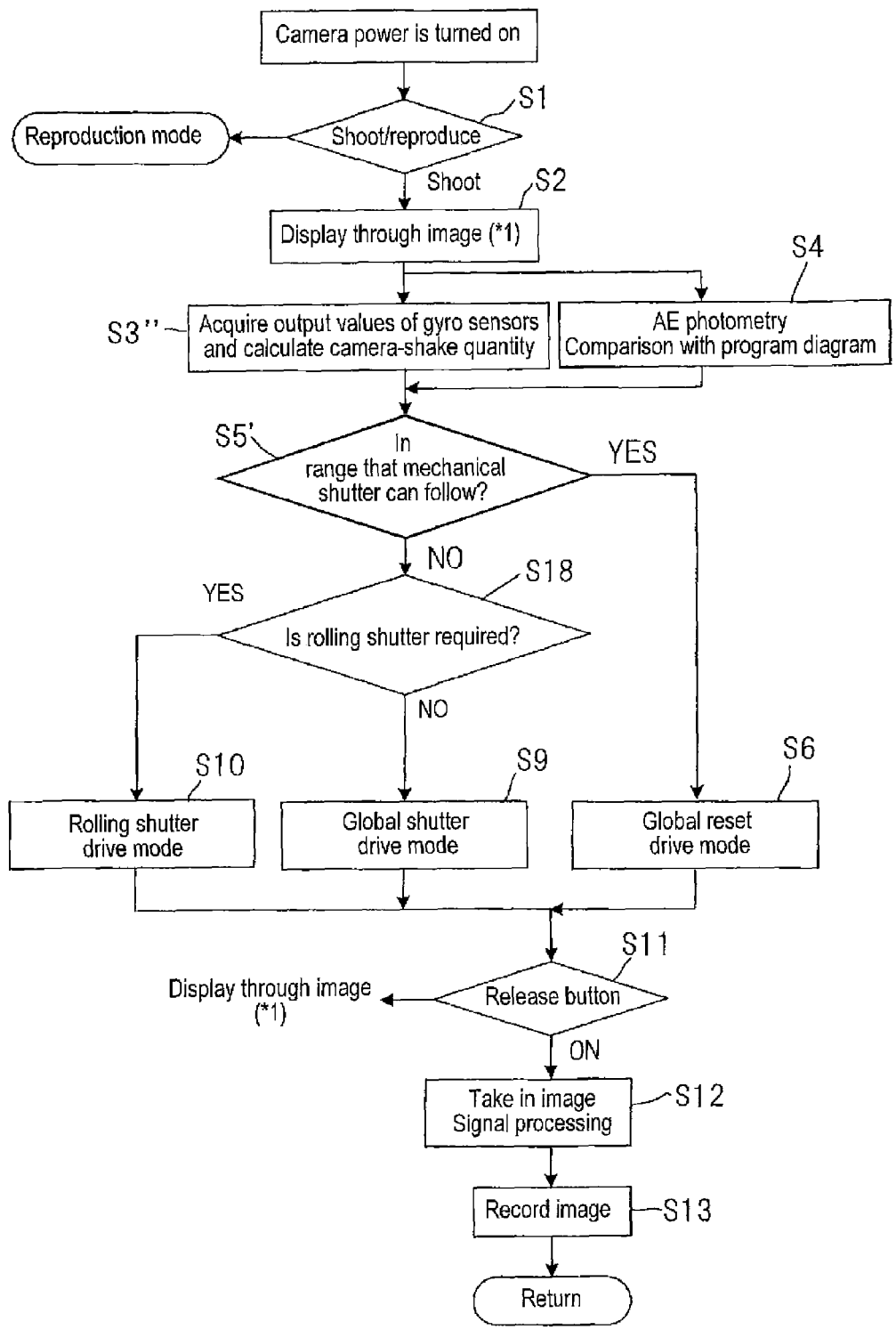
FIG. 6 is a flowchart showing the operation procedure of an imaging control program, which includes shutter drive mode selection steps, according to a fifth embodiment.

FIG. 6 is a flowchart showing the operation procedure of an imaging control program according to a fifth embodiment of the invention. In this embodiment, a shutter drive mode of the CMOS image sensor 7 is selected using the gyro sensors 9 and 10 and the image stabilization function during shooting of a still image. The same steps as in the first embodiment (FIG. 2) are given the same reference symbols as those in the first embodiment and will not be described in detail. Only different steps will be described in detail.

In this embodiment, step S3" is executed in place of step S3 in FIG. 2. At step S3", output values of the gyro sensors 9 and 10 are taken in, and a camera shake quantity is calculated. At the next step S5', it is determined as to whether (i) the mechanical shutter 8 can follow because the camera shake quantity is small or (ii) the mechanical shutter 8 cannot follow because the camera shake quantity is large.

If the mechanical shutter 8 can follow, the global reset method is selected at step S6. If the mechanical shutter 8 cannot follow, the process moves from step S5' to step S18, where the camera shake quantity and the AR value are compared with respective reference values. If it is determined that rolling shutter is required, the process moves to step S10, where the rolling shutter method is selected. If it is determined that the rolling shutter is not required, the process moves to step S9, where the global shutter method is selected.

As described above, in this embodiment, information of a camera shake quantity is acquired from the gyro sensors 9, 10 and the image stabilization circuit 32, and it is determined as to whether or not a shutter speed determined from AE photometry data is in a range where blur in an image of a subject can be reduced. If blur can be reduced, the global reset method is selected. If the shutter speed is out of such a range as to be followed by the mechanical shutter 8 (i.e., the mechanical shutter 8 is ineffective), the rolling shutter method or the global shutter method is selected based on the camera shake quantity.

In the rolling shutter drive, focal plane distortion occurs because the exposure timing varies from one line to another. If this type of distortion and distortion caused by camera shake occur simultaneously, an image is distorted terribly and hence is very poor. In contrast, this embodiment can prevent such distortion because the shutter drive mode is switched according to the camera shake state.

Figure 7:
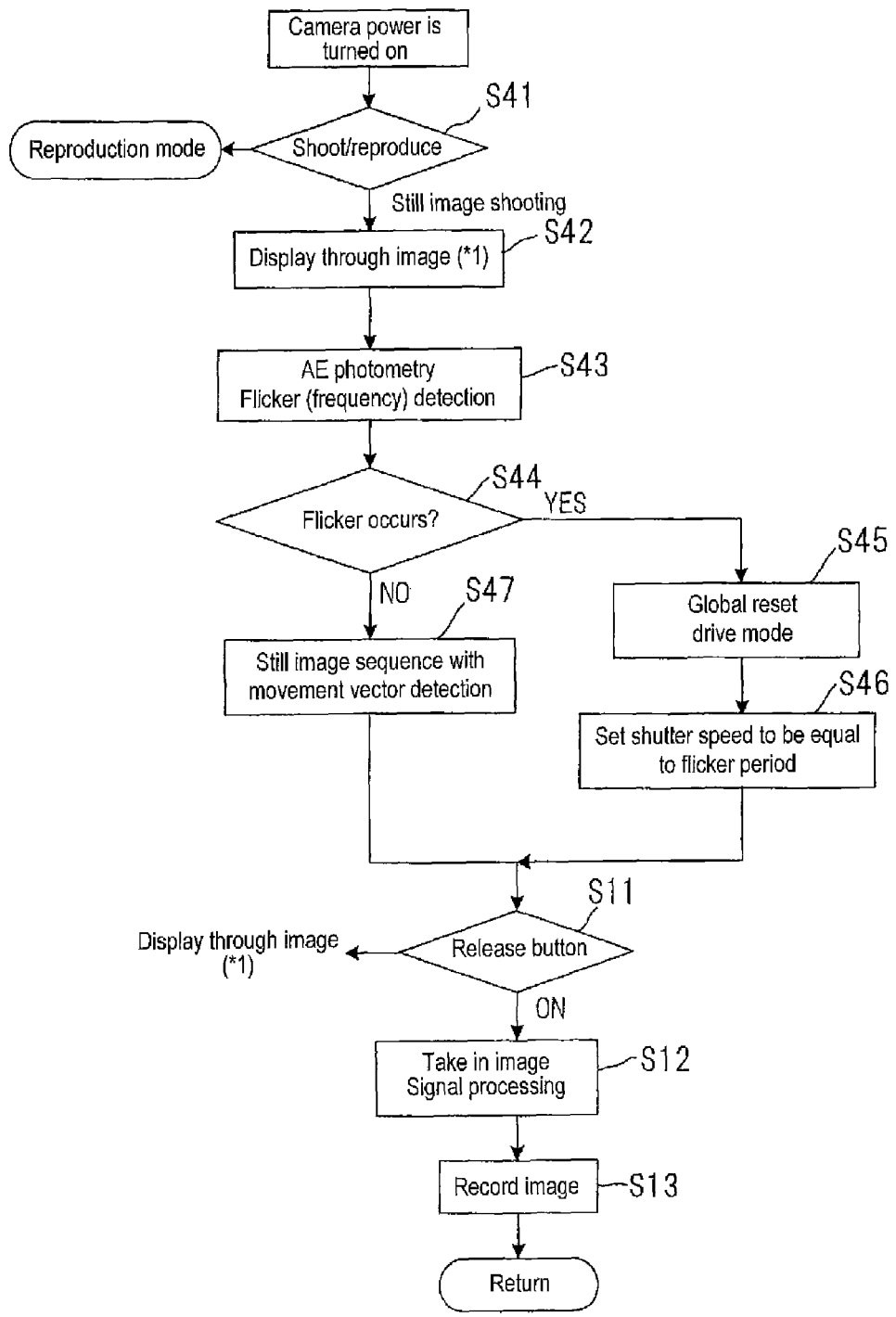
FIG. 7 is a flowchart showing the operation procedure of an imaging control program, which includes shutter drive mode selection steps, according to a sixth embodiment.

FIG. 7 is a flowchart showing the operation procedure of an imaging control program according to a sixth embodiment of the invention. An imaging device according to this embodiment is equipped with a flicker detecting unit. When a flicker is detected, a still image is taken with the shutter drive mode of the CMOS image sensor 7 being fixed.

First, at step S41, it is determined as to whether the current operation mode is a shooting mode or a reproduction mode. If the current operation mode is the reproduction mode, the process moves to a reproduction mode process. If the current operation mode is the shooting mode, the process moves to the next step S42, where a through image is displayed. At the next step S43, AE photometry and flicker detection (detect if flicker is present and detect a frequency of a flicker) are performed.

At the next step S44, it is determined as to whether a flicker was detected. If a flicker was detected, the process moves to step S45, where the global reset method is selected. At the next step S46, the shutter speed is set to be equal to a flicker period and the process moves, in order, to the same steps as steps S11, S12, and S13 shown in FIG. 2.

If it is determined at step S44 that a flicker was not detected, the process moves to the next step S47, where a still image processing sequence with motion vector detection (e.g., the sequence for selecting the rolling shutter method or the global shutter method according to any of the embodiments of FIG. 2, 3, etc.) is executed. Then, the process moves to step S11.

In shooting under such light sources as fluorescent lamps, a periodic variation in luminance (flicker) is detected due to a fluctuation of the illumination light. In such a case, in this embodiment, the global reset method is selected preferentially. Since the global reset method is always selected when a flicker is detected, the shutter drive method is fixed to the global reset method while a flicker continues to be detected.

If shooting is performed by the rolling shutter method under such light sources that a flicker is caused, luminance unevenness cannot be prevented form occurring in one image even if the shutter speed is synchronized with the luminance variation frequency of the light sources because the exposure timing varies from one line to another. In contrast, this embodiment makes it possible to prevent image quality deterioration due to a flicker even in such a situation because the global reset method is selected with the highest priority being given to it.

Figure 8:
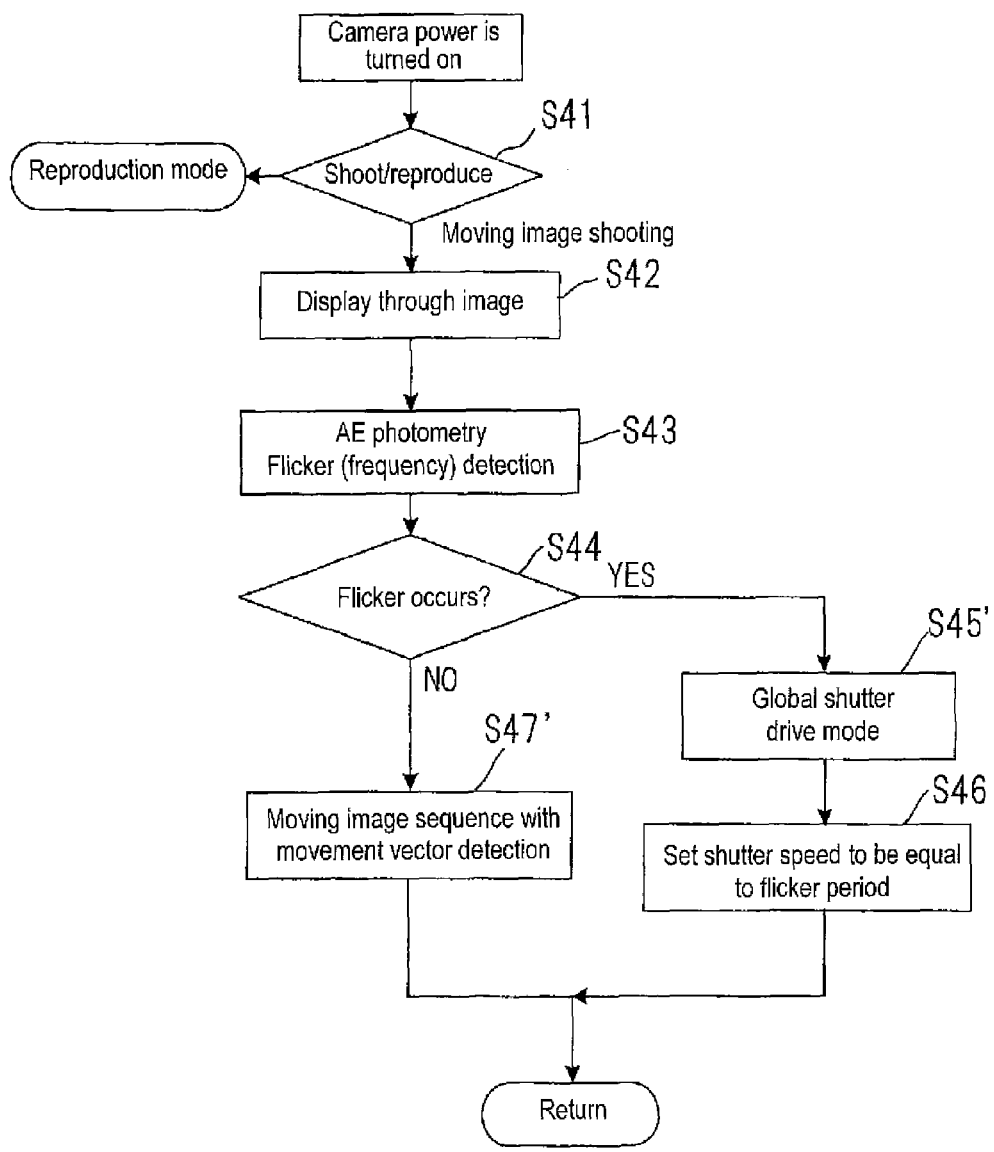
FIG. 8 is a flowchart showing the operation procedure of an imaging control program, which includes shutter drive mode selection steps, according to a seventh embodiment.

FIG. 8 is a flowchart showing the operation procedure of an imaging control program according to a seventh embodiment of the invention. Whereas the sixth embodiment is directed to still image shooting, a process according to this embodiment is executed when a moving image is shot (therefore, the global reset method is not selected). The same steps as shown in FIG. 7 are given the same reference symbols as those in FIG. 7 and will not be described in detail.

If it is determined at step S41 that the current operation mode is a moving image shooting mode, the process moves to steps S42, S43, and S44 in order as in the sixth embodiment. If it is determined at step S44 that a flicker is present, the process moves to step S45', where the global shutter method is selected as a shutter drive mode. At the next step S47, the shutter speed is set to be equal to a flicker frequency.

If it is determined at step S44 that a flicker is not detected, the process moves to step S47', where a moving image processing sequence with motion vector detection (e.g., the sequence for selecting the rolling shutter method or the global shutter method according to the embodiment of FIG. 5, etc.) is executed.

If a moving image is shot by the rolling shutter method under such light sources that a flicker is caused, luminance unevenness cannot be prevented form occurring in an image even if the shutter speed is synchronized with the luminance variation frequency of the light sources because the exposure timing varies from one line to another. In contrast, this embodiment makes it possible to prevent image quality deterioration due to a flicker even in such a situation because the global shutter method is selected with the highest priority being given to it.

The imaging device and its shutter drive mode selection method according to the above embodiments are useful when applied to digital cameras, etc. because a proper shutter drive mode is selected automatically according to motion of a subject and other factors.

What is claimed is:

1. An imaging device comprising: a MOS image sensor that shoots an image of a subject; and a control unit configured to analyze a through image of the subject obtained by the MOS image sensor before main shooting, the analysis including a comparison between a magnitude of an inter-frame motion vector of the through image and a reference value, selects one of plurality of shutter drive modes based on a result of the comparison, the plurality of shutter drive modes including a global reset mode, a global shutter mode, and a rolling shutter mode, and drives the MOS image sensor in the selected shutter drive mode, wherein the reference value is corrected based on a photometric value.

2. The imaging device according to claim 1, wherein the control unit calculates the inter-frame motion vector of the through image.

3. The imaging device according to claim 1, wherein the control unit calculates an inter-frame motion vector, for an entire frame, of the through image.

4. The imaging device according to claim 1, wherein the control unit divides one frame into plural blocks, calculates an inter-frame motion vector, for each of the plural blocks, of the through image, and performs the selection automatically based on the inter-frame motion vectors for the respective blocks.

5. The imaging device according to claim 4, wherein the control unit performs the selection automatically by comparing a variation of the inter-frame motion vectors for the respective blocks with a given value and comparing magnitudes of the inter-frame motion vectors for the respective blocks with a reference value.

6. The imaging device according to claim 1, wherein when the main shooting is in a sequential shooting mode, the control unit performs the selection automatically further based on an analysis result of an inter-frame motion vector obtained during the main shooting.

7. The imaging device according to claim 1, wherein when a still image of the subject is shot, the control unit selects one of a rolling shutter drive mode, a global shutter drive mode, a global reset drive mode, and when a moving image of the subject is shot, the control unit selects one of the rolling shutter drive mode and the global shutter drive mode.

8. The imaging device according to claim 7, further comprising:
a flicker detecting unit that detects if a flicker occurs, wherein
if the flicker detecting unit detects a flicker in shooting the still image, the control unit selects the global reset drive mode, and
if the flicker detecting unit detects a flicker in shooting the moving image, the control unit selects the global shutter drive mode.

9. A shutter drive mode selection method of an imaging device, wherein the imaging device includes a MOS image sensor that shoots an image of a subject; and a control unit that selects one of plural shutter drive modes including a global reset mode, a global shutter mode, and a rolling shutter mode and drives the MOS image sensor in the selected shutter drive mode, the method comprising: analyzing a through image of the subject that is obtained by the MOS image sensor before main shooting, the analyzing including a comparison between a magnitude of an inter-flame motion vector of the through image and a reference value; and performing the selection automatically based on a result of the comparison, wherein the reference value is corrected based on a photometric value.

10. The method according to claim 9, further comprising:
calculating the inter-frame motion vector of the through image.

11. The method according to claim 9, further comprising:
calculating an inter-frame motion vector, for an entire frame, of the through image.

12. The method according to claim 9, further comprising:
dividing one frame into plural blocks; and
calculating an inter-frame motion vector, for each of the plural blocks, of the through image, wherein
the performing performs the selection automatically based on the inter-frame motion vectors for the respective blocks.

13. The method according to claim 12, wherein the performing performs the selection automatically by comparing a variation of the inter-frame motion vectors for the respective blocks with a given value and comparing magnitudes of the inter-frame motion vectors for the respective blocks with a reference value.

14. The method according to claim 9, wherein when the main shooting is in a sequential shooting mode, the performing performs the selection automatically further based on an analysis result of an inter-frame motion vector obtained during the main shooting.

15. The method according to claim 9, wherein
when a still image of the subject is shot, the performing selects one of a rolling shutter drive mode, a global shutter drive mode, a global reset drive mode, and
when a moving image of the subject is shot, the performing selects one of the rolling shutter drive mode and the global shutter drive mode.

16. The method according to claim 15, wherein
if a flicker is detected in shooting the still image, the performing selects the global reset drive mode, and
if a flicker is detected in shooting the moving image, the performing selects the global shutter drive mode.

* * * * *